US012591664B2

(12) United States Patent　　　　(10) Patent No.:　US 12,591,664 B2
Dergacheva et al.　　　　　　　　　 (45) Date of Patent:　　Mar. 31, 2026

(54) SYSTEM AND METHOD FOR REMOTE USERS ACTIVITIES ADMINISTRATION

(71) Applicant: Constructor Technology AG, Schaffhausen (CH)

(72) Inventors: Svetlana Dergacheva, Schaffhausen (CH); Serg Bell, Singapore (SG); Stanislav Protasov, Singapore (SG); Alexey Rybak, Schaffhausen (CH); Laurent Dedenis, Schaffhausen (CH)

(73) Assignee: Constructor Technology AG, Schaffhausen (CH)

( * ) Notice: Subject to any disclaimer, the term of this patent is extended or adjusted under 35 U.S.C. 154(b) by 435 days.

(21) Appl. No.: 18/054,909

(22) Filed: Nov. 13, 2022

(65) Prior Publication Data

US 2024/0160729 A1　　May 16, 2024

(51) Int. Cl.
*G06F 21/55*　　　　(2013.01)
*G06F 21/32*　　　　(2013.01)
*H04L 67/50*　　　　(2022.01)

(52) U.S. Cl.
CPC ........... *G06F 21/554* (2013.01); *G06F 21/32* (2013.01); *H04L 67/535* (2022.05)

(58) Field of Classification Search
CPC ....... G06F 21/554; G06F 21/32; H04L 67/535
See application file for complete search history.

(56) References Cited

U.S. PATENT DOCUMENTS 7,395,027 B2　　7/2008　Seitz et al.
8,904,473 B2　12/2014　Sambamurthy et al.

8,926,335 B2　　1/2015　Kumar et al.
9,154,748 B2　10/2015　Hsu et al.
9,852,275 B2　12/2017　Sambamurthy et al.
9,870,713 B1 *　1/2018　Ducrou ..................... G09B 5/08
10,290,199 B2　　5/2019　Kumar et al.
11,205,349 B2　12/2021　Jaeh et al.
2004/0010720 A1　1/2004　Singh et al.
2011/0223576 A1　9/2011　Foster et al.
2012/0176220 A1 *　7/2012　Garcia ..................... G06F 21/32
　　　　　　　　　　　　　　　　340/5.83

FOREIGN PATENT DOCUMENTS

CN　　　　112822156 A　　5/2021
JP　　　　2010009055 A　　1/2010
KR　　　　101534307 B1　　7/2015
WO　　WO2021144770 A1　　7/2021

OTHER PUBLICATIONS

Atoum et al "Automated Online Exam Proctoring", IEEE Transaction on Multimedia, Dec. 30, 2015 (Year: 2015).*

* cited by examiner

*Primary Examiner* — Noura Zoubair
(74) *Attorney, Agent, or Firm* — ESPE Legal Consultancy FZ-LLC

(57)　　　　　　ABSTRACT

System and method for administration of remote user activities interacting with critical data are used to detect violations of user activities, generate hints in response to each violation or a group of violations, that includes video-based violations, audio-based violation, and display-control-based violations, and to display hints to the administrator in a prioritized manner helping the administrator to react to most critical violations in a proper way. The invention solves a problem of simultaneous monitoring of multiple user interactions with critical data by ranking each violation, each session of interaction and each user.

20 Claims, 10 Drawing Sheets

701    702    703    704    705

| | Video | Score | Email | Exam | Course | Last ping |
|---|---|---|---|---|---|---|
| Logo | ☐ | 99 | Maria@student.com | 27 | Physics | 11:21:03 |
| Home | ☐ | 87 | Saul@student.com | 25 | Course name | 21:16:23 |
| Sessions | ☐ | 83 | Ivan@student.com | 27 | Course name | 15:57:04 |
| Calendar | ☐ | 72 | Carl@student.com | 25 | Math | 19:34:11 |
| Proctoring | ☐ | 69 | Maria@student.com | 27 | Physics | 11:21:03 |
| Exams | ☐ | 67 | Saul@student.com | 25 | Course name | 21:16:23 |
| Archive | ☐ | 63 | Ivan@student.com | 27 | Course name | 15:57:04 |
| Staff | ☐ | 52 | Carl@student.com | 25 | Math | 19:34:11 |
| Companies | ☐ | 42 | Carl@student.com | 25 | Math | 19:34:11 |
| Students | ☐ | 39 | Maria@student.com | 27 | Physics | 11:21:03 |
| Reports | ☐ | 37 | Saul@student.com | 25 | Course name | 21:16:23 |
| Tools | ☐ | 33 | Ivan@student.com | 27 | Course name | 15:57:04 |
| | ☐ | 32 | Carl@student.com | 25 | Math | 19:34:11 |

Figure 7A

SYSTEM AND METHOD FOR REMOTE USERS ACTIVITIES ADMINISTRATION

FIELD OF THE INVENTION

The present disclosure generally relates to the field of secure data workflow technologies, and in particular to a method and system for controlling the behavior of users interacting with confidential content on computing devices under supervision. The invention can be used on user devices connected to computer networks or on dedicated devices for detecting and preventing security breaches and fraud.

BACKGROUND OF THE INVENTION

When working with confidential information or operating with critical information and critical infrastructure, the use of access controls is not an adequate measure to protect information from leakage or systems from the user faults. The main cause of data leakage and system breakdowns are faults, violations of the rules for working with data and business systems or theft of information by authorized users. Ensuring data security requires an increased level of control over users during their work with data. For this, various software and hardware tools of the DLP (data leakage prevention) class are used. These tools provide control over data operations on a workstation. In addition to controlling operations in the operating system and applications on a work computer, there is a risk of data leakage through other channels, such as taking a picture of the screen, showing the screen to an unauthorized user, dictating or discussing content using personal devices, and so on. To deal with these threats, audio and video monitoring of the workplace is used. When trying to automate the processing of events from such systems to prevent fraudulent actions, certain technical problems arise. These problems include the integration of data from security systems, as well as the correlation of events related to violations of the rules for working with data. The consequence is false positives when automatically blocking data without prior analysis by a supervisor or proctor. In the case when the actions of the data operator are monitored by the administrator, who makes the final decisions on terminating sessions or counteracting data leakage, another technical problem arises, which consists in the complexity of monitoring activity on a multitude of controlled workstations, the number of which can be several times greater than the ability to display them on security interface.

SUMMARY OF THE INVENTION

When a user attempts to access critical data on the user's computer, the user must be authorized for this operation. If the authentication completes successfully, the critical data is provided to a user. In one embodiment, data is provided in a browser in the form of web-content. In the course of operating with the data the user activity is controlled for violations that are the result of user interaction control rules pre-configured on an administration service. The administration device that includes a console for managing and controlling users' sessions displays hints about the sessions and violations detected in controlled time periods. For efficient administration of several sessions, the hints are ranked in accordance with predefined rules and weights related to each type of violation. These include video-based violations, audio-based violations, and display-controlbased violations. Hints are displayed to the administrator in a prioritized manner and lead the administrator to react to most critical violations first.

The invention simultaneously monitors multiple user interactions with critical data by ranking each violation, each session of interaction, and each user activity. The invention can be implemented on user devices and connected administration devices, or on distributed networks of user devices, administrator devices, and service computers.

In an embodiment, the method for administration of remote user activities interacting with critical data comprises capturing video data from a camera, audio data from a microphone, and desktop activity events on the user computer. The method further comprises authenticating the user based on user photo image at administration module, wherein the user photo image is compared to a face recognized from the captured video data and authorizing access to the critical data if the authentication is successful. The method further includes detecting violations in user activities in accordance with rules of user interactions with critical data and violation weights pre-configured at an administration server. Detecting a violation comprises the steps of detecting violations of user activity based on captured video data at the face recognition unit, detecting violations of the user activity based on captured audio data at the voice control unit, and detecting violations of the user activity based on captured desktop activity events at the desktop control unit. Detecting violations of prohibited hardware device usage is based on captured video data at the hardware in the frame control unit. User sessions and each detected violation are ranked in accordance with the rules of user interactions with critical data and violation weights. For each violation or a series of violations there is generated a hint in a form of audio, video, text, image, or other computer object, representing the violation and response action. The method further comprises displaying hints in a prioritized way on an administrator console.

In an embodiment, the data processing and communication system for administration of remote user activities interacting with critical data comprises a monitoring module, installed on the user computer and configured to capture video, audio, and desktop activity data. The system further comprises an administration module, installed on administration server and configured to setup rules of user interactions with critical data and provide users with access to critical data, control module, installed on administration server and configured to analyze user activity based on captured data and ranking user activity sessions by detected violations in accordance with rules of user interactions with critical data. The system further comprises a display control module, installed on the administration server and configured to generate a hint in the form of web-application objects and to prioritize the view of the hints in accordance with user activity session ranks. The control module further comprises a face recognition unit configured to identify user and to detect violations in user activity based on captured video data. The system further comprises a voice control unit configured to detect violations of the user activity based on captured audio data, desktop control unit configured to detect violations of the user activity based on captured desktop activity events and hardware in the frame control unit configured to detect violations comprising prohibited hardware device usage based on captured video data.

In an embodiment, critical data includes confidential data, graphical interface of the critical infrastructure services, personal data, or examination tests.

3

In an embodiment, data from a camera, data from a microphone, and desktop activity events are captured in a synchronized manner. Each violation detected based on video data, audio data, or desktop activity events is complemented with video, audio, and desktop activity events captured throughout the time period of the detected violation and stored in an associated manner.

In an embodiment, data from a camera, data from a microphone, and desktop activity events are captured and stored from the start of critical data access requests.

In an embodiment violation weight depends on the time period when the violation occurs.

In another embodiment, violations in user activity are determined based on a captured video signal. In a further embodiment, this captured video signal includes the appearance or change of emotion on a face, a change in the number of faces in the frame, a change in the direction of gaze, the passage of biometric identification, immobility of the object of observation, wearing a mask, wearing sunglasses, wearing a hat, or applied makeup.

In another embodiment, a violation resulting from prohibited hardware device usage includes at least the appearance of photo-video equipment in the frame, the appearance of a telephone in the frame, or the appearance of digital storage medium in the frame.

In yet another embodiment, violations in user activity are based on a captured audio signal that includes at least one of dictation of data content, an extraneous voice, extraneous noise, or user voice modification.

In yet another embodiment, violations in user activity are based on captured desktop activity events. These events include connecting hardware, running software, switching between windows, copying data, screenshot, capturing graphics card image, transferring data over the network, connecting an additional screen, opening a remote desktop session, or changing operating system configurations.

In yet another embodiment, web-application objects representing the hint include a pop-up window, link, a webpage, an html file, an archive file, a text file, an xml file, a database record, a web-page frame or container, a data block, a script with executable instructions, programming code, an audio record, a video record, a graphical image, or a diagram.

DESCRIPTION OF THE DRAWINGS

FIG. 7A shows an exemplary implementation of the administrator GUI.

DETAILED DESCRIPTION

The solution includes three subsystems that allow for narrowing of focus to the actions of users interacting with protected content and quickly responding to user violations in order of their degree of danger or security risk.

The first subsystem provides parallel data collection from audio and video capturing devices and the module for monitoring user actions with the operating system. A microphone is used as an audio device, for example, built into the user's computer. As a video capturing device, a video camera is used, such as a web camera connected to the user's computer or IP camera installed in the user's workplace area. User interaction with operating system objects, such as opening files, running applications, establishing connections with other devices, moving the cursor, opening web pages, or switching between application windows in the graphical interface can be implemented using software, hardware or firmware, for example, by intercepting API requests, injecting into applications for data operation, filtering drivers and other tools that allow identification of all events in the system that characterize the user's interaction with the data.

The second subsystem provides data processing in two modes, synchronous and asynchronous. This allows for monitoring user activity, referred to as user behavior, in real time. It also allows for inspecting actions after the user performs data operations. This helps to return to events that have already been completed and review user actions in more detail and at different event playback speeds. The result of the work of the second subsystem is the formation of security events from the received data streams, including the correlation of events and their ranking. This allows for taking into account the criticality of the data and the degree of danger of user violations.

The third subsystem is responsible for the administrator's interface, in which user sessions and anti-violation guides for administrators are not displayed identically for all devices, users and sessions, but are displayed in order of priority, taking into account current events and their ranks. For example, the session window (desktop or camera video) for the most critical session will be enlarged relative to the windows of other sessions, highlighted or opened in a new window. According to each observed event, a response tip or a script to respond to the violation will also be displayed, which the administrator can execute or confirm.

Figure 1:
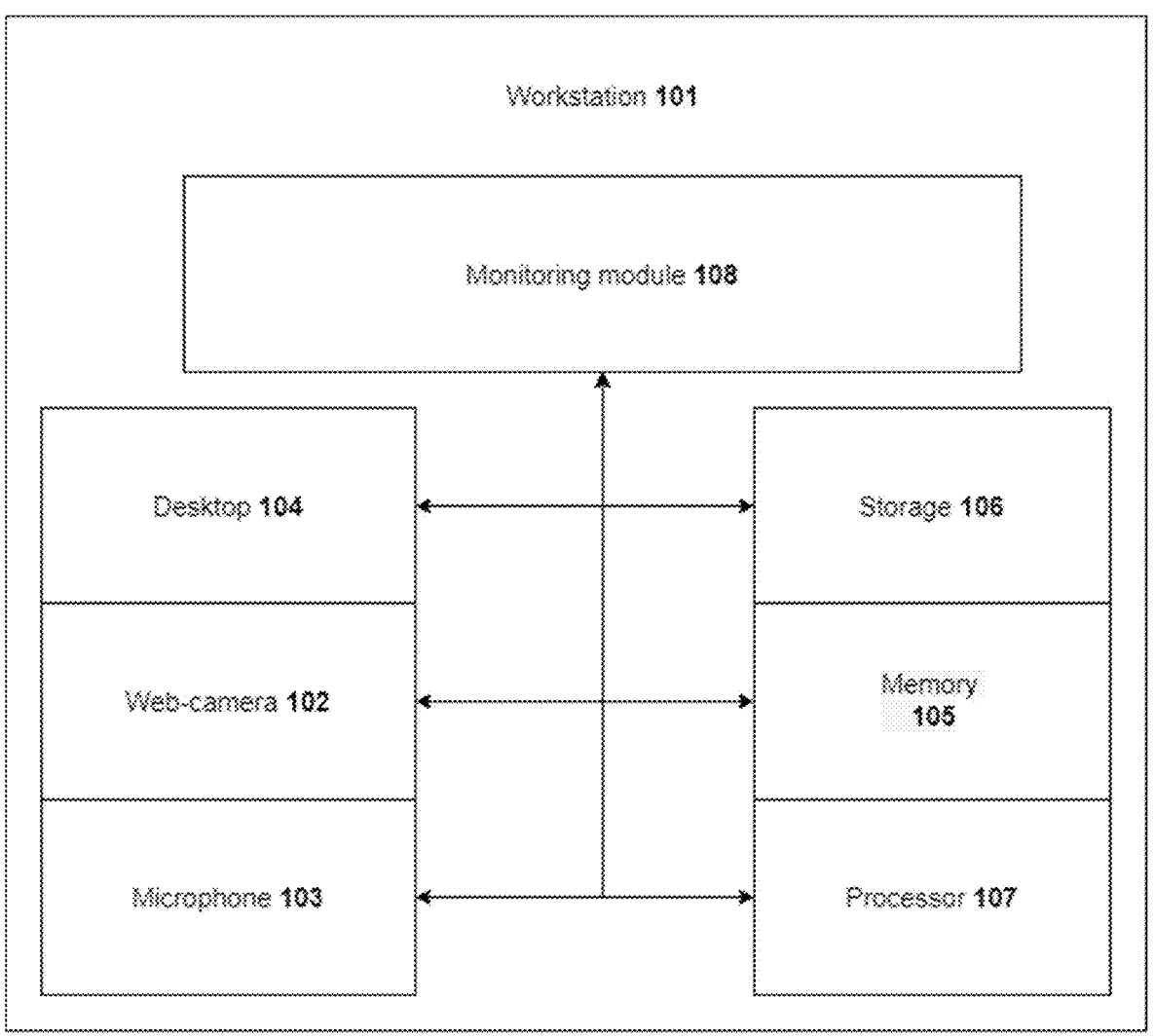
FIG. 1 shows an exemplary user computer system.

FIG. 1 shows a user's computer 101, which is configured to provide an administrator access to certain computer resources. For example, the user's computer is configured to provide supervision. This is done by way of a web-camera 102 that allows video recording of the user's face and surroundings, a microphone 103 that allows recording of the user's voice and sounds from his surroundings, and by administrator access to operating system resources to monitor the desktop 104. The desktop includes a screen interactive environment that allows the user to access the directories and applications of the computer, and switch between active windows of running applications.

Other software and hardware of computer 101 may also be involved in the implementation of the invention. Examples include memory 105 and storage device 106 that allows recording and executing, in addition to the operating system, monitoring module 108, including drivers, utility software and the software necessary for interacting with information and observing user behavior by way of webcam 102, microphone 103, and desktop 104.

Figure 2:
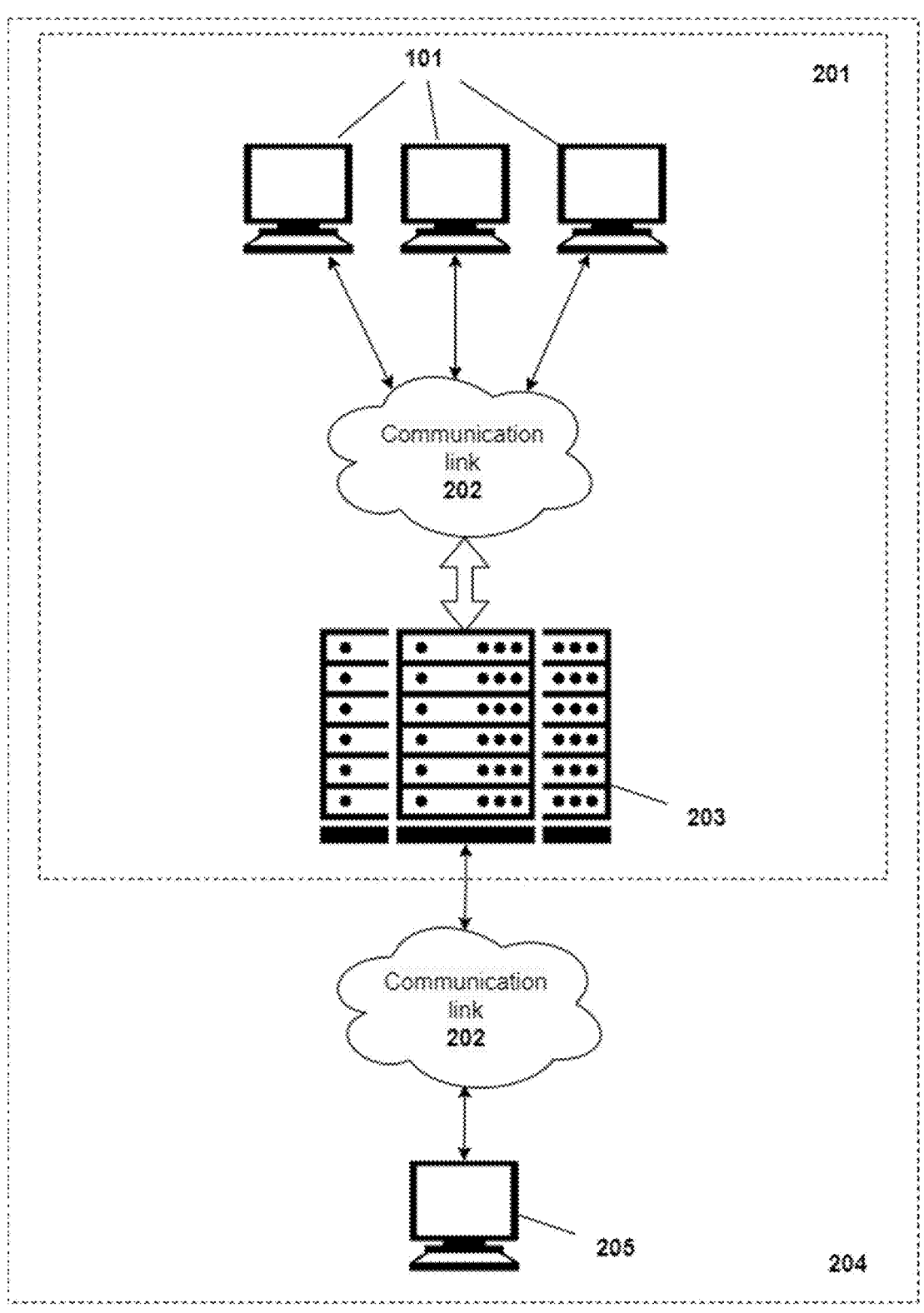
FIG. 2 shows diagrams of synchronous and asynchronous user monitoring modes.

FIG. 2 shows the process of monitoring user activity in asynchronous or synchronous mode. Asynchronous monitoring mode 201 assumes that user computers 101 can be networked via communication link 202 operating over the Internet, through which data is exchanged between computers 101 and server infrastructure 203. Server infrastructure 203 consists of physical or virtual servers, either centralized or distributed. In an embodiment, each of the servers from the distributed infrastructure is a stack consisting of a media server, a web server, and a business logic server. The media server is designed to provide broadcasting and recording of video streams. The web server provides interaction between the web browser of the computer 101 and the business logic server. The business logic server includes operational services and databases. By way of these services and databases, it is possible to store and process data coming to the server infrastructure 203 from computers 101 and to send commands, data, and signals from the infrastructure 203 to computers 101. The results of the supervision, referred to as monitoring or proctoring, are stored and processed in the infrastructure 203, and then after the completion of the monitored session, the results are available for review from a computer that has access rights to the results.

Synchronous mode 204 represents a similar approach of interaction between computers 101 and infrastructure 203, but additionally includes simultaneous interaction with infrastructure 203 of administration devices 205 via a communication link 202 operating over the Internet. Administration devices 205, acting as proctoring devices, is a group of one or more devices on which administrators or proctors monitor user activities, controlling data operation in a console or using system administrative tools, like virtual desktop. The results of the supervision are stored and processed in the infrastructure 203 and are made available for review in real time or after the completion of the monitored session from the administration devices 205. Administration devices are configured to operate with infrastructure 203.

Figure 3:
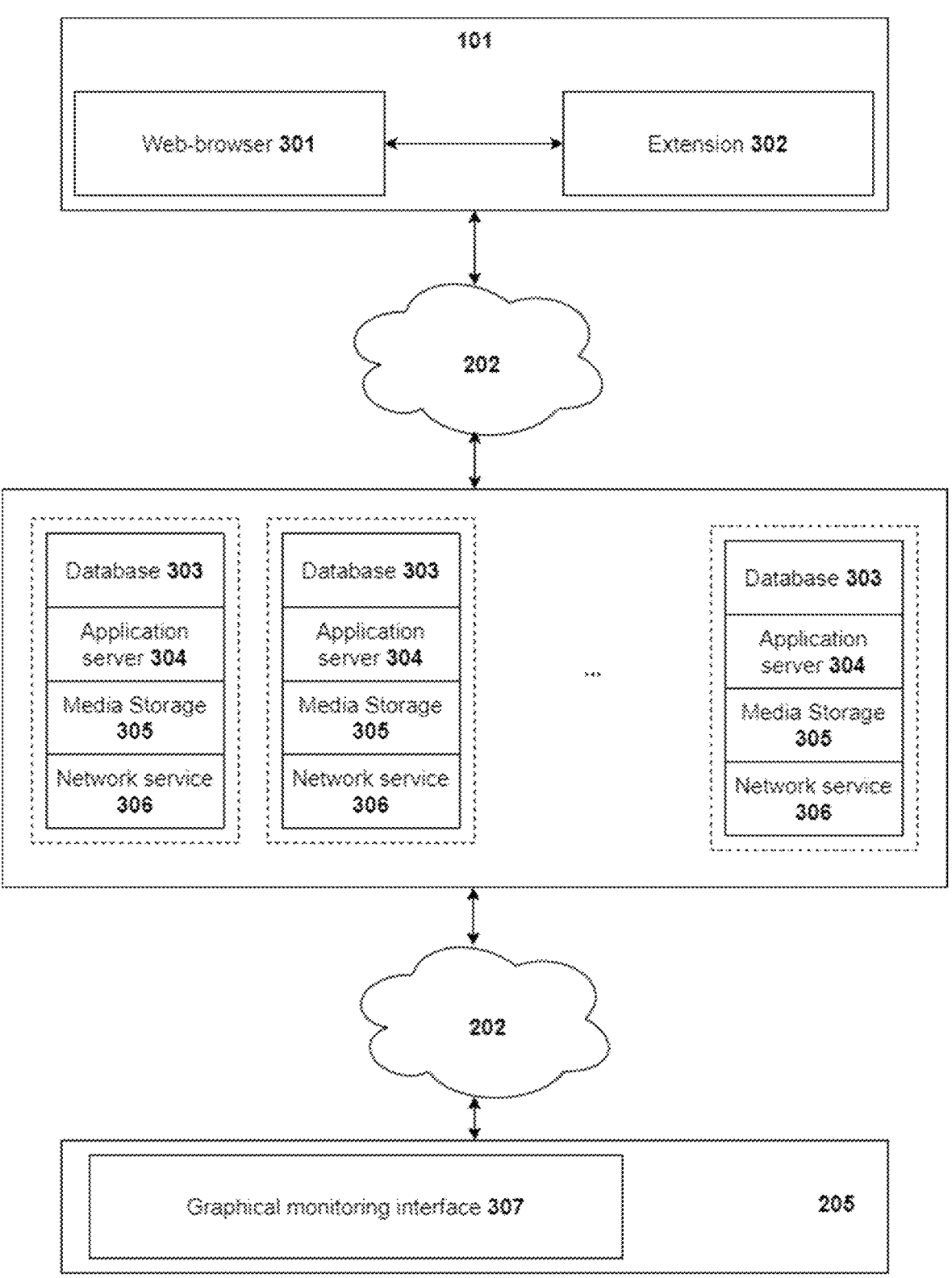
FIG. 3 shows a diagram of the interaction of software and hardware of the process of monitoring users.

FIG. 3 shows a detailed diagram of the monitoring process. A web browser 301 is used to provide access to information. Additionally, a client extension 302 is preinstalled and launched on the computer 101, which makes it possible to extract results and other intermediate supervising data and subsequently transmit them to the infrastructure 203 and further to the administration devices 205 via communication link 202. The client extension 302 can be launched in the operating system environment of computer 101 or directly within the web browser environment 301 when the extension is configured as a web browser plug-in 301.

Infrastructure 203 may be implemented as a number of networked physical servers, each running guest virtual servers with a containerization package. In an embodiment, the containerization package is a Docker platform. In such embodiments the number of processed sessions can be extended due to the ease of scaling virtual servers of containers. Database 303 container includes a database server, which provides writing, reading, modification of metadata, and data about monitoring procedures and users. The Application server container 304 includes an application server consisting of software modules that provide functionality for implementing the claimed method and system. Media storage container 305 includes a storage of multimedia data, which provides recording, reading, modification of video data, and audio data obtained during the monitoring sessions. Storing data in media storage is achieved by receiving data from a proxy server used as an intermediate server between a users' devices and data storage. Network service 306 container contains tools for working with data flows over the network, load balancing, and providing access for user devices to the application.

Interaction of the administrator with the results of supervision is possible through the administrator's web interface 307. The interface 307 displays information about violations received from one or more users. In one embodiment the notification about the violation can be sent via a chat, in which the administrator is informed in the form of text or sound alerts about events or results of supervision. A hint about the user's behavior is displayed by way of interface 307 in the form of an indication, text, script, or in schematic form. Interface 307 can further provide the administrator with the ability to view the video stream coming from the webcam of the user's computer in real time, or from the archive in which the monitoring session is recorded.

Figure 4:
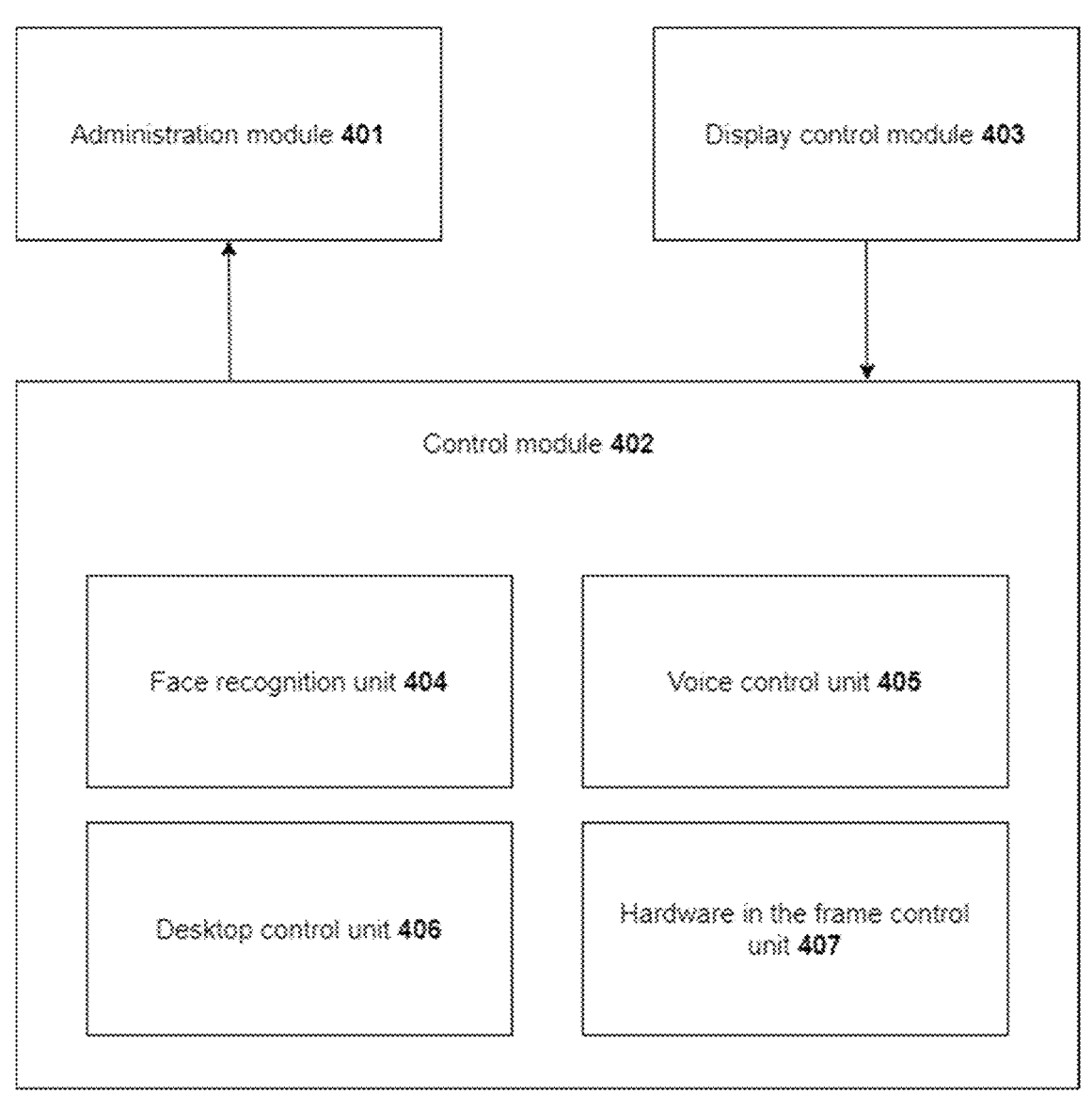
FIG. 4 shows a block diagram of a system for prioritizing hints by actual sessions of user interactions with content.

FIG. 4 shows the system for prioritizing prompts, also referred to as hints, about the behavior of users interacting with content. The system for prioritizing hints consists of related functional modules. These include related administration module 401, control module 402, and prompt display control module 403.

Each module can be implemented using at least one processor, a random access or non-volatile memory device capable of providing the operation of program modules, as well as at least one physical network interface capable of exchanging data and commands between the user and administrator devices via communication links 202. In another embodiment each module can be implemented as a computer program module and libraries, shells, applications, or software packages, depending on the particular function or method step implemented by the particular module. Computer program modules may be implemented by way of machine code or as program text in a programming language. Examples of possible programming languages include C, C++, C #, Java, Python, Perl, Ruby.

Administration module 401 provides user devices with access to content, provides at least one supervising device with access to data streams generated by user devices interacting with content, sets initial values for the counter of violations of rules of interactions with content for each user, and sets up rules of interactions with content at least for some users.

Control module 402 is configured to perform control actions for a group of users. These actions include detecting user activity events in the data stream from the user's device, defining a weight to activity events representing violations of the interaction rules, and counting violations for the corresponding user. Further actions included generating hints about the user's behavior, including the result of comparing the current value of the counter with at least one threshold value. The control module can be divided into four functional blocks dedicated to analyzing a certain type of data that can be obtained using the software and hardware of the user's computer. The control module blocks are face recognition unit 404, voice control unit 405, desktop control unit 406, and hardware in frame control unit 407.

Face recognition unit 404 is designed to detect events that can be attributed to video violations. Voice control unit 405 is configured to detect events that can be attributed to voice violations. Desktop monitoring unit 406 is configured to detect events that can be attributed to violations associated with desktop activity. Hardware in frame control unit 407 is configured to detect events that can be attributed to violations associated with appearance of prohibited hardware devices in the frame of the captured video data. Although control module 402 is shown with three functional blocks, there may be many more such blocks, depending on the specific types of user violations that need to be detected during the user activity monitoring procedure.

Display control module 403 is configured to compare the current violation counter value for the user with at least one preset threshold value and perform ranking of the values of violation counters corresponding to users. It then displays, in priority order, on at least one supervising device, a predetermined number of hints about the behavior of those users who correspond to the highest current values of violation counters.

Functional modules are configured to be executed in computer networks having a client-server architecture, in which most of the calculations are performed on the server side, administrating a plurality of user devices. In an embodiment, the user's device, the monitoring device, and, if necessary, an additional server device share the functionality of the system. In an embodiment, some system modules are installed on the user's device, some system modules are installed on the administration device, and some of the system modules are installed on a separate server device. For example, administration module 401 and display control module 403 may be installed on an administrator device, and instances of the control module 402 may be installed on users' devices. In this embodiment, the system significantly relieves the load on the communication channels, since the detection of user activity events and violations of the rules for interacting with content is carried out on the user's device, and there is no need to transmit large amounts of data over the communication channel. Control module 402 on the user's device sends non-zero data values containing information about detected activity events and violations in the form of user activity hints to display control module 403, which is installed on the administration device or on a separate server device.

Figure 5:
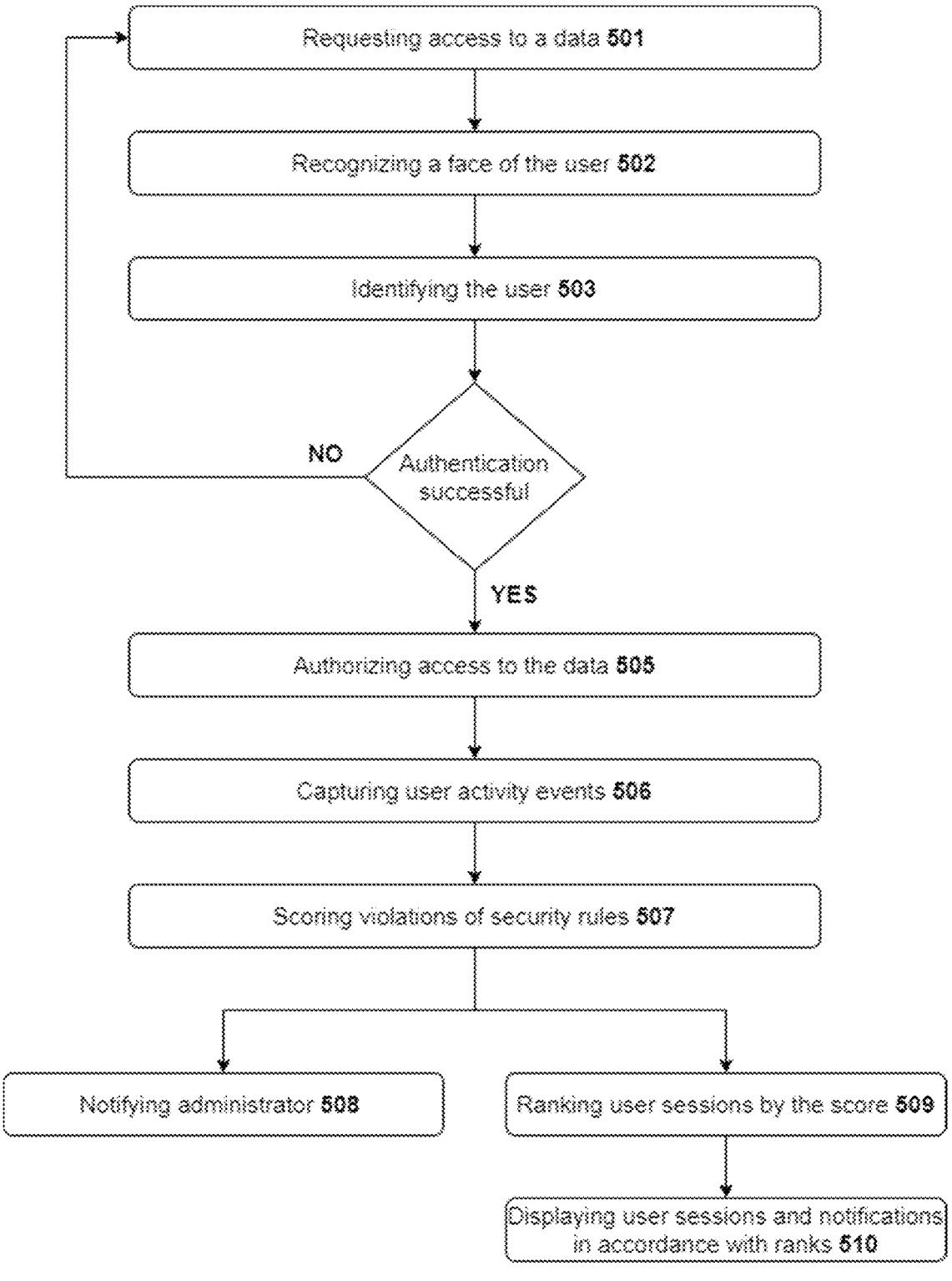
FIG. 5 shows an exemplary flowchart of the user activity monitoring procedure.

FIG. 5 shows the user activity monitoring procedure. Access to content begins at step 501, in which the user is prompted to go through an identification procedure to ensure that the content will be provided to the exact user who has permission to interact with the content. Interaction with content includes reading, writing, modifying, copying, polling, voting, data entry, and so on. If the content is confidential information, then actions such as recording or copying may not be available to all or some users. Also, depending on the access control model, different users can be granted different rights, related to their permitted interaction with the content.

At step 502, an image with the user's face is obtained. Such an image can be extracted from a video data stream, the frames of which depict the user's face. The user's face can be revealed in one or more frames using a pattern-recognition algorithm. An example of such an algorithm comprises analysis of key points of the face. In addition to the video data stream, the user's photo may be used as an alternative or primary source of the user's face image. In an embodiment, the creation of the user's video stream and photograph is carried out using a web-camera 102. In some cases, the absence of a webcam on the user's device may be grounds for denying the user access to content. The presence of more than one face in an image extracted from a video stream or photo may also be a reason for denying access to content.

At step 503, identification data is received from the user to establish identity. An identification document (ID card) with a photo of the user can be used as identification data, for example, passport, building pass, student ID, or similar registration card bearing an image of the user.

In the next step 504, the user's identity is automatically verified based on the user's face identified in step 502 and the identity received in step 503. Verification 504 is represented by the user identification procedure. User identification can be carried out once before the start of the procedure for monitoring behavior and also dynamically by repeatedly doing so at other times during the monitoring procedure.

Alternatively, identification can be done manually by an administrator. In an embodiment, automatic identification is carried out by means of a neural network, trained for face recognition of system users. This neural network includes a library of image processing algorithms, computer vision, and numerical algorithms. The neural network processes the frames of the video stream or photo received from the user's webcam and transmits the processing results to the control module responsible for registering user identification events based on the similarities found between the image of the user's face processed by the neural network and the image received in the form of identification data. If check 504 fails, then the user is prompted to return to step 501, where the user is prompted to go through the identification procedure.

At step 505, the user is granted access to the content if the user passed the identification procedure at step 504 successfully. Granting access to content is carried out by accessing a network resource via a link issued to the user or a service designed to interact with content using a web browser. Alternatively, access to the content can be provided to the user through any other suitable means of communication, such as email or online messenger.

At step 506, user activity events are detected in the data streams from the user's device. The identification of user activity events is carried out in several stages, which are repeated in a loop until the procedure for monitoring user activity is completed. Detection of the mentioned behavior events includes collecting primary data about user actions, extracting values of behavior event features from the collected primary data, generating vectors of behavior event feature values, matching the feature value vector and event occurrence conditions. Detection of user activity events is implemented by control module 402 units, face recognition unit 404, voice control unit 405, desktop control unit 406, and hardware in frame control unit 407.

The first step in detecting behavioral events is collecting primary data about the actions that the user takes through the software and hardware of their device. Preferably, the raw data includes activity data that can be captured by the webcam, microphone, and user activity tracking software on the device. The collection of primary data is carried out in the form of audio and video data, graphic, text, biometric data, but is not limited to the mentioned forms.

The next step in detecting behavioral events is to extract behavioral event feature values from the collected raw data. Behavior event features describe user actions that result in a change in user activity. For example, a feature of a behavior event is a change in the coordinate of a key point of the user's face, and the value of the feature is the difference between the initial value of the point's coordinate and the value of the point's coordinate after it has changed. Feature values can appear in several dimensions: horizontally, vertically, or in depth.

The next step in detecting behavior events is the determination of the feature-values vector of user-activity events. Examples of user-activity events include connecting hardware, running software, switching between windows, copying data, screenshotting, capturing graphics card images, transferring data over the network, connecting an additional screen, opening a remote desktop session, changing operating system configurations, the appearance or change of emotion on a face, a change in the number of faces in the frame, a change in the direction of gaze, the passage of biometric identification, immobility of the object of observation, wearing a mask, wearing sunglasses, wearing hats, applied makeup, the appearance of photo-video equipment in the frame, the appearance of a telephone in the frame, the appearance of digital storage medium in the frame, recording or printing text on paper or digital media, dictation of data content, extraneous voices, extraneous noise, user voice modification, and whispering.

Each behavior event is described in terms of several dimensions in the value vector. Suppose for event i, N values of features in the vector are defined. Then the event i corresponds to the value from the vector V: V(i,1), . . . , V(i,N), which corresponds to the time points t1, . . . , tN.

For example, the vector of feature values describing the coordinates of the key points of the user's face can be formed in the following general form: [x1, y1, . . . , xm, ym], x ∈[0, W], y ∈[0, H], where m—the number of key points of the face; W—the maximum value of the horizontal coordinate; H—the maximum value of the vertical coordinate.

A vector of feature values that describes the angle of rotation of the user's head: [roll, yaw, pitch], where the variables take values from –90° to 90° or from 0 to 180° in height, width, and depth.

Feature value vector describing the level of user involvement in the content interaction process: [e, a], e, a ∈[0, 100] where e—the level of expression of the user's face; a the user's attention level.

The vector of feature values that describes the number of additional random-purpose devices simultaneously connected to the user device at a certain point in time: [d], where d—the number of devices.

In particular, the event of user activity may be a change in the status of his biometric identification. Biometric identification statuses are successful user identification, unsuccessful user identification, and detection of faces of other users in the video data stream or in the user's photo.

The next step in activity events detection is to compare the vector of feature values with predefined conditions for the occurrence of user activity events. If, during matching, the feature value vector corresponds to at least one event occurrence condition, then the generated vector is considered to be a detected user activity event. A detected event is assigned with an identifier, a time interval for its detection, and an event type. Types of events include hardware connection, software launch, the appearance or change of emotion on the face, the change in the number of faces in the frame, the change in the direction of gaze, and the passage of biometric identification.

At the next step 507, user violations of the rules for interacting with content are scored. Scoring of violations is carried out in several stages, which are repeated cyclically until the procedure for monitoring user activity is completed. Scoring of violations is carried out simultaneously with the identification of user activity events. Violation scoring includes assigning a weighted value to those behavioral events that are violations, updating the violation counter value, and comparing the current violation counter value with a threshold value.

Each user activity event can be considered as a normal event or as a violation of the rules for interacting with the content. These rules may differ depending on the type of content. However, some events must meet additional criteria in order to be classified as violations. For example, looking away from the screen by the user is not always a violation of the rules. If the user looks away for 10 seconds, then this behavioral event can be regarded as normal. However, if the user turns away for 1 minute or more, then such a behavioral event can be classified as a violation. Similar criteria are set when configuring rules for interacting with content. The conditions for classifying user activity events as violations of the rules for interacting with content are pre-set on the server for installing, processing, and storing data and are transmitted to the user's device using a data network.

Violations, depending on the type of data stream, can be classified into one or more of the following categories: video violations, voice violations, violations associated with desktop activity, violations associated with user identification, and violations associated with dynamic verification of the user's identity.

The category of video violations includes the user looking away from the device screen, the user's absence from the frame, the presence of additional faces in the frame, the substitution of the face in the frame, or the use of third-party technical means, for example, photo and video recording tools.

The category of voice violations includes the presence of a conversation, detection of a user's voice or extraneous voices, or turning off audio devices.

The category of violations associated with desktop activity includes changing the active desktop window, moving the mouse out of the application workspace, or using sites or software that are prohibited by the rules for interacting with content.

A weight value is assigned to a user activity event if any of the units of the control module has detected a violation of the rule for interacting with content. The weight value can be measured in points. In one exemplary embodiment, the number of points can be measured on a scale from 0 to 100. In this case, all violations can be divided into several classes, depending on the nature of the violation. So, if the violations are divided into two classes—minor and major, then the weight values can be calculated as follows: for each minor violation, the user is awarded ten points, for each major violation—twenty points.

As minor violations, a long look away, a conversation, the presence of another person in the video stream from the webcam can be considered. The absence of a user in the frame, user substitution, use of photo and video recording tools, changing the active desktop window, accessing a site, or using software prohibited by the rules for interacting with content can be considered as significant violations.

In an embodiment, an individual weight value is set for each violation at the configuration stage, during the monitoring procedure, and after its completion. In this case, for each violation, an individual weight value can be set depending on the duration of the violation. A violation lasting less than 5 minutes may have an increased weight value. A violation lasting more than one hour may not carry additional weighting.

In an embodiment, the initial value for the counter of violations of the user is set arbitrarily. For example, the initial value of the violation counter may depend on the history of previous supervisions of the user. If the violation counter during the previous user activity monitoring procedure stopped at 40 points, then the initial violation counter value for the next monitoring procedure can be set to 40 points. The initial value of the violation counter can be set to a value reduced by a few points in order to reduce the influence of the results of the previous monitoring procedure on the new monitoring procedure. Setting a non-zero initial value of the violation counter for a user ensures that during a new monitoring procedure, a hint about the behavior of this user will be displayed in priority order than hints about the behavior of those users for whom no penalty points were assigned before the current monitoring procedure. In addition, for each new monitoring procedure, the violation counter can be reset, so that for all users the initial value of the counter will be zero.

Figure 6A:
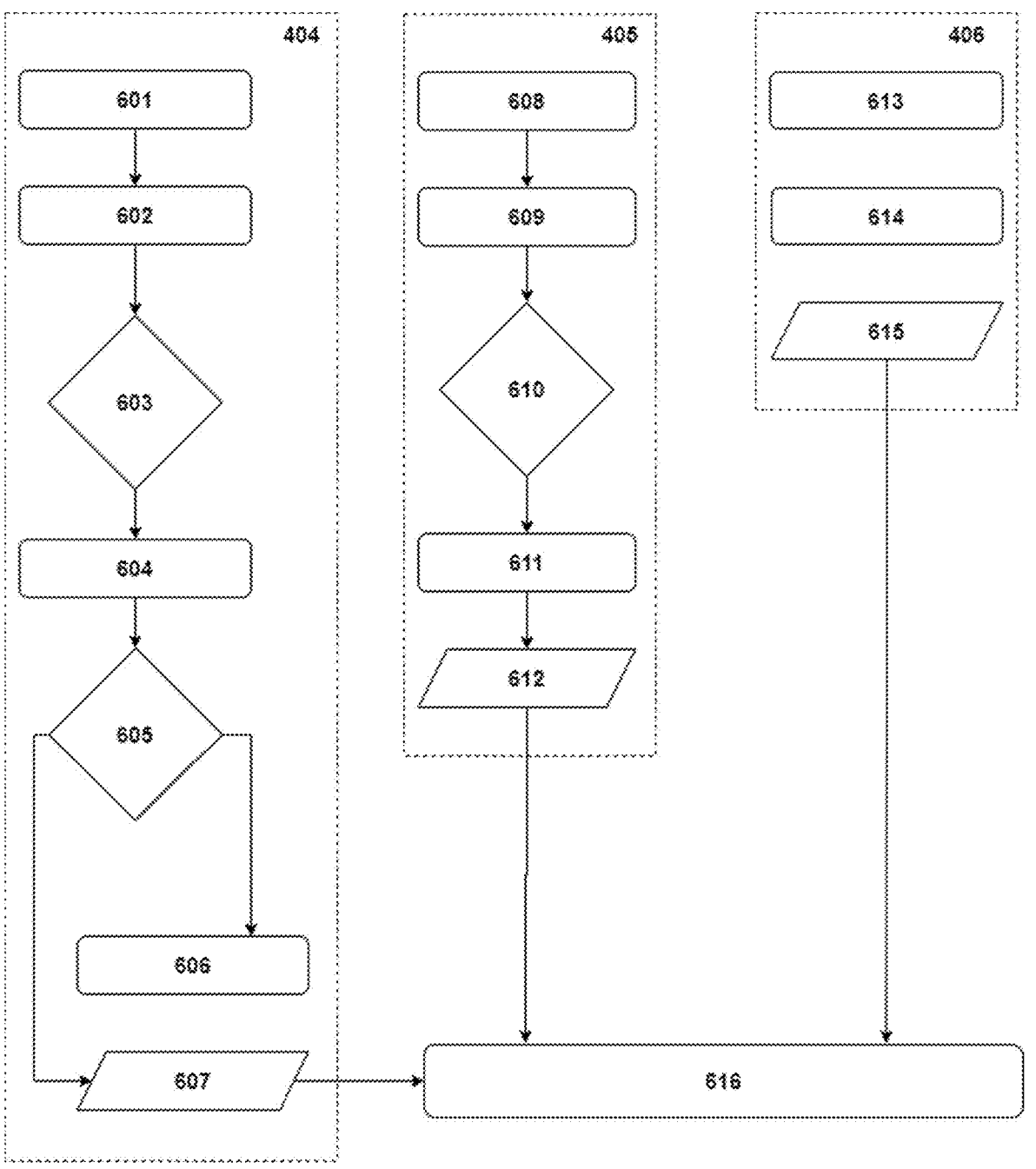
FIG. 6A shows the beginning of a flowchart of the violation scoring procedure.
Figure 6B:
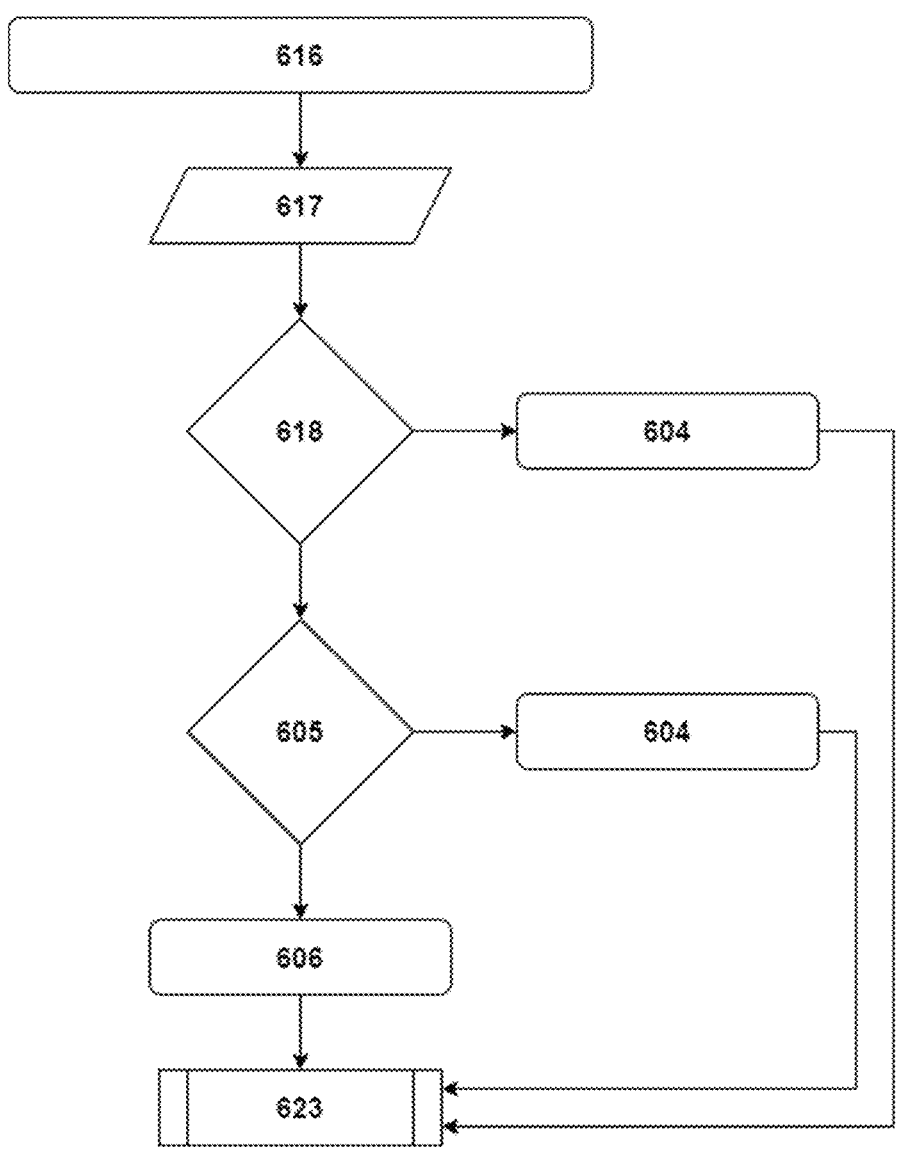
FIG. 6B shows the end of a flowchart of the violation scoring procedure.

FIG. 6A and FIG. 6B show the procedure for scoring violations. A characteristic of human behavior is the fact that each violation does not occur instantly, therefore, it cannot be discrete, it takes time (a continuous segment lasting more than 1 second) necessary for the object to perform an action that is an event of one of the categories of violations and can be fixed by the control module 402.

Units 404-407, while in the active state, check their associated data type, waiting for an event to be recognized.

Upon recognition 601 of an event from the category of video violations, unit 404 initiates the execution of the $cybCam_{auto}$ function 602 that captures video violations. After receiving data about the beginning of recording a video violation, a timer is activated with a predetermined time interval, for example, within five minutes. At step 603, a check is made of the type of events to be recognized within a predetermined time interval. If the check 603 fails, then return to step 602. If the check 603 fails, then the detected events are grouped 604 and the violation type is assigned 605 to the grouped event. If the violation is significant, then the weight is assigned to it 606, based on the function $P(1)*cybCam_{auto}$, in which P(1) is the assigned weight for the first type of violation (major violations). Otherwise, if two types of violations are defined (major/minor), then the violation is assigned a weight of 607, based on the function $P(2)*cybCam_{auto}$, in which P(2) is the assigned weight for the second type of offense (minor offenses).

An individual weight value can be assigned to a violation, regardless of the type to which the violation belongs.

Libraries and algorithms that allow for event recognition associated with video violations provide an accuracy for event recognition within 64-82%. This percentage of accuracy results in false positives or false negatives. However, if a violation actually occurs, then several operations occur within a short period of time. In practice, the number of activations can be three or more cases in one minute. Therefore, checking 603 with a timer allows for reducing the impact of automatic event recognition on monitoring results.

When recognizing 608 an event from the category of voice disorders, unit 405 initiates the receipt 609 of the value $cybVoice_{auto}$, capturing voice disorders. After receiving data about the start of recording a voice violation, a timer is activated with a predetermined time interval. At step 610, a check is made of the type of events to be recognized within a predetermined time interval. If check 610 ends with a negative result, then the process returns to step 609. If check 610 ends with a positive result, then grouping step 611 of recognized events is carried out. For voice impairments, only one type of impairment can be defined, preferably minor. In such a case, the violation is assigned a weight at step 612, based on the value of $P(2)*cybVoice_{auto}$, in which P(2) is the set weight for Type 2 (minor) violation or individual weight value.

Upon detection step 613 of an event from the category of violations associated with desktop activity, the module 406 initiates the execution of the $cybDesk_{auto}$ function 614. As each desktop event is detected, it is assigned a weight at step 615 based on a $P(2)*cybDesk_{auto}$ value in which P(2) is the set weight for Type 2 (minor) violation or individual weight value.

In addition to the three categories of violations and individual coefficients mentioned above, dynamic identification of the user's identity $cybIdent_{auto}$ can also be performed for violations related to the identification and verification of people in the frame.

The violations identified during the monitoring procedure and their weights are then processed 616, for example, their sum is calculated to determine the user's current score. Considering the weightings that are provided for each of the categories of violations, the formula for the current scoring score will be as follows:

$$F=\Sigma(P(1V2)\times cybCamauto(N)+P(2)\times cybVoiceauto(N)+P(2)\times cybDeskauto(N)),$$

where P (1 V 2)—predefined weight value for violations; cybCamauto (N)—video violation number; and cyb Voiceauto (N)—voice violation number.

The weight value for a violation may depend on the duration of the violation. For this purpose it is necessary to normalize the duration of the violation relative to the duration of the monitoring procedure. For example, the weight value can be calculated in points and range from 10 to 20 points depending on the duration of the violation relative to the duration of the monitoring procedure and the individual weight value, with a maximum possible value of 100 points, at which access to the content for the user is automatically terminated.

The supervision score value F may be automatically updated during the entire monitoring procedure. At the same time, throughout the session, the proximity of the estimated value F and the preset threshold value K is monitored at step 617.

The threshold value K is set based on the degree of disciplinary control of the event. The sum of the weights of all violations of the user has a limit of 100 points, in the form of normalization of the evaluation scale. Based on this, if the threshold value of 100 points is selected, then the supervision for all control measures is considered passed and user sessions have a positive, correct status. If the threshold value of 0 points is selected, then the supervision for all control activities has the incorrect status and requires additional manual review by administrators. If the threshold value is more than half of 100 points, it means that several violations (more than two) are allowed. If the threshold value is less than half, then a strict scoring mode is selected, implying a minimum number of violations (for example, one or two violations).

In the case of checking step 618, if the score F exceeds the threshold value K, then the user is denied access to the content due to exceeding at step 619 the number of allowable violations. Otherwise, it proceeds to check at step 620 if the score F has exceeded the lowered threshold value of 0.75K, and then a hint about the user's suspicious behavior at step 621 is returned to the administrator. If the value of F did not exceed the value of 0.75K, then the procedure for monitoring the user's behavior is considered successful, without exceeding the number of permissible violations. In this case, a hint is returned to the user that the user's behavior is in good 622. At the end of the session, data on automatically detected violations is recorded in the archive 623. Also, the archive can include all or part of the streaming data received during the supervision from the devices 101 of users.

The next step 508 provides a hint about the behavior of the user interacting with the content. Hints can be targeted to an administrator and provided in real time, when one administrator observes several users at the same time.

The hint can be provided to the administrator in text, graphic, or sound form. The hint may be an indicator, on the scale of which the number of penalty points received by the user as a result of observing his behavior is reflected. An example of a scale used for this purpose would be a scale of one hundred points. Depending on the number of penalty points, the indicator may change colors. For example, the indicator turns green when the number of penalty points is zero or significantly lower than the set threshold. The indicator shows a yellow color when the number of penalty points is slightly below the mentioned threshold and a red color when the number of penalty points exceeds the threshold. Depending on the color of the indicator, the monitoring procedure may lead to restricted access to content or require action or attention from the administrator. Note that the color indication can be arbitrary, as well as the set threshold value for changing the color of the indication and the number of threshold values, which can be more than one. If one threshold value is set at eighty points, then when receiving eighty points or more the user's access to the content is closed. The hint may include a fragment of the data stream on which the violation was recorded. In an embodiment, video data showing how the user violates the rules of interaction is used. Access to such data can be provided to the administrator through a link, in a new pop-up window, simultaneously with the display of a text hint. In various embodiments, the hint is provided in a form of webpage, html file, archive, text file, xml file, database record, webpage frame or container, data block, script with executable instructions, programming code, audio record, video record, graphical image, diagram, or a in a combination of ways.

At step 509, which is performed concurrently with steps 507-508, the current values of the violation counters corresponding to the users are ranked. In an embodiment, the ranking includes the formation of a complete list of users interacting with the content and participating in the monitoring procedure. In the above list, users can have a rank number from 1 to N, with the value N corresponding to the number of users interacting with the content during the monitoring procedure. The list of users can be sorted in a descending way in accordance with the current values of the counters of violations corresponding to users. In this case, the user for whom the current value of the counter is the largest receives the rank number 1. The user following him by the value of the counter receives the rank number 2. Assignment of other rank numbers is carried out in a similar way. During the monitoring procedure, the rank numbers of users change. Changing the user number is carried out in relation to the numbers and corresponding values of the counters of other users. The re-ranking of the list of users is carried out whenever the current value of the violation counter changes for any of the users. When the list is re-ranked, it is possible that the position of users relative to each other changes.

At step 510, a predetermined number of user activity hints are displayed in priority order. The display of these hints may occur concurrently with steps 507-509, as long as at least one user who committed at least one violation of the rules of interaction with the content is sufficient for a hint about his behavior to be provided to the viewer in priority order. The priority display order of hints means that hints about the behavior of those users who commit the most violations of the rules for interacting with content are displayed to the viewer first. The number of tips that are displayed in priority order can be set in advance and limited. Setting a set value allows the administrator to follow the user's behavior without losing focus. The priority display order of prompts is determined by the ranked list of users, which is created and updated in step 509. For example, if the number of prompts displayed in priority order is limited to 5, then behavioral prompts of users with ranking numbers 1-5 in the list are displayed. The appearance of a hint may be accompanied by an audible signal to additionally attract the attention of the administrator.

In an embodiment, hints about user activity are displayed on a viewing device in the form of a list, with hints displayed in priority order having a graphical design that visually distinguishes them from other displayed hints. For example, priority hints can have a bright color, a different style (bold, italic), a different font size. Priority cues may be performed in some other way that attracts the administrator's attention.

User activity hints may be displayed on the viewing device as a grid of frames, with hints displayed in priority order having a graphical design that visually distinguishes them from other displayed hints. Each frame is a part of the viewer's graphical interface that contains some information about the user's behavior or about the user, such as their name.

A predetermined number of prompts displayed on the viewing device in priority order are displayed using one or more attention-grabbing tools from the following group: placement at the top of the graphical interface, color change, setting boundaries, increase in size, or launch in a separate window.

According to the example shown in FIG. 7A, the administrator GUI displayed on the viewing device contains information about the behavior of users interacting with the content. Hints about user activity are displayed in the form of a list. Each element of the list is characterized by several fields. Field 701 contains a button for calling a window with a video stream from the user's device. Field 702 contains information about the current value of the counter corresponding to the user. Field 703 contains the user ID in the list. Such an identifier can be email, login, or username. Fields 704 and 705 may be reserved for some overhead information that identifies the content the user is interacting with. For example, field 704 may indicate an exam or project, and field 705 may indicate a training course or a task of the user.

Figure 7B:
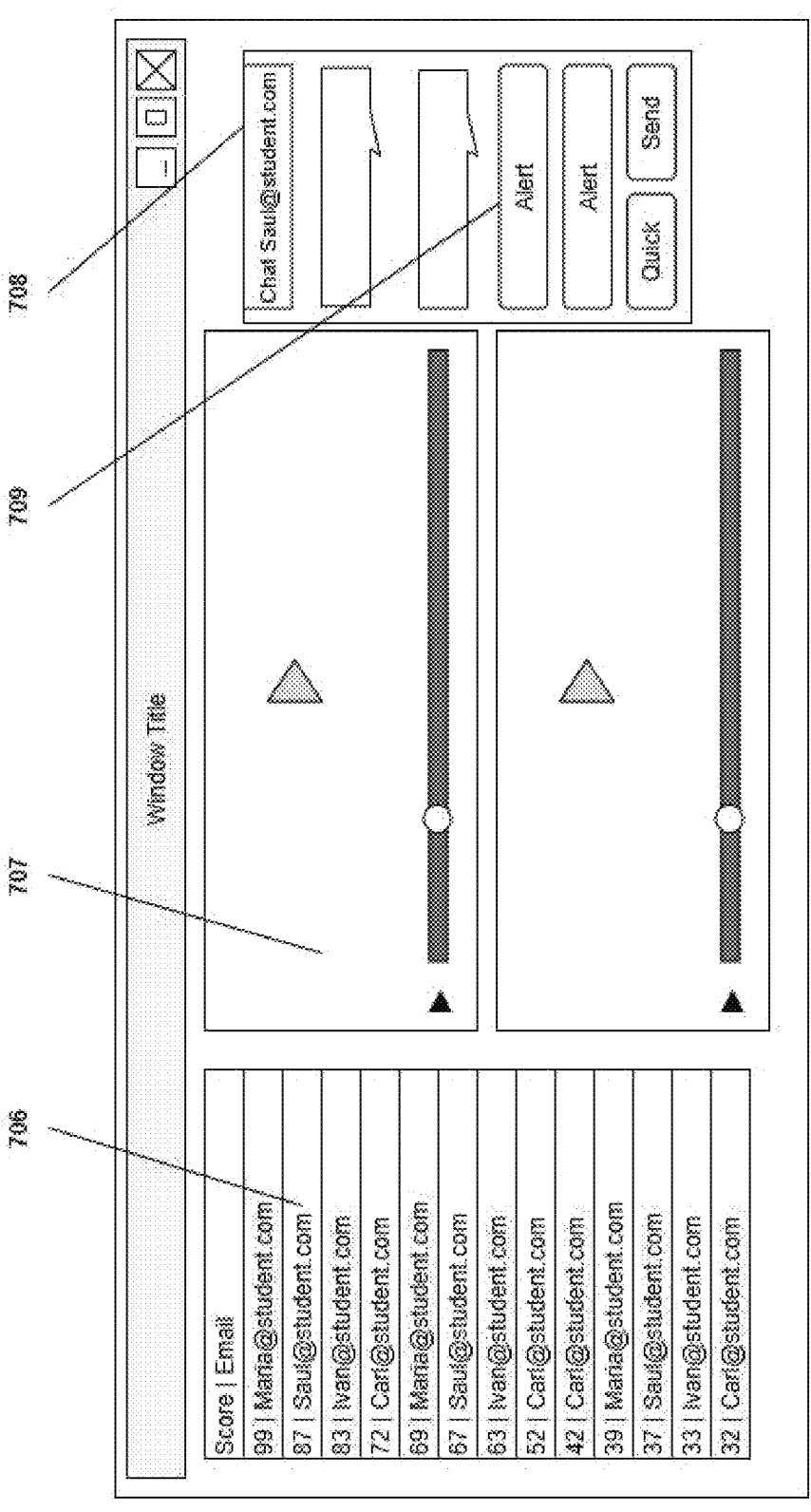
FIG. 7B shows an example of calling an additional window in the administrator interface.

In accordance with the example shown in FIG. 7B, the administrator GUI displayed on the viewing device allows, when hovering over an active tooltip or hint 706, for expanding the tooltip in an additional window. The additional window is part of the administrator's graphical interface, which displays video stream 707 from the user's device and a chat with the administrator 708, through which detected behavior events and violations 709 are communicated.

Figure 7C:
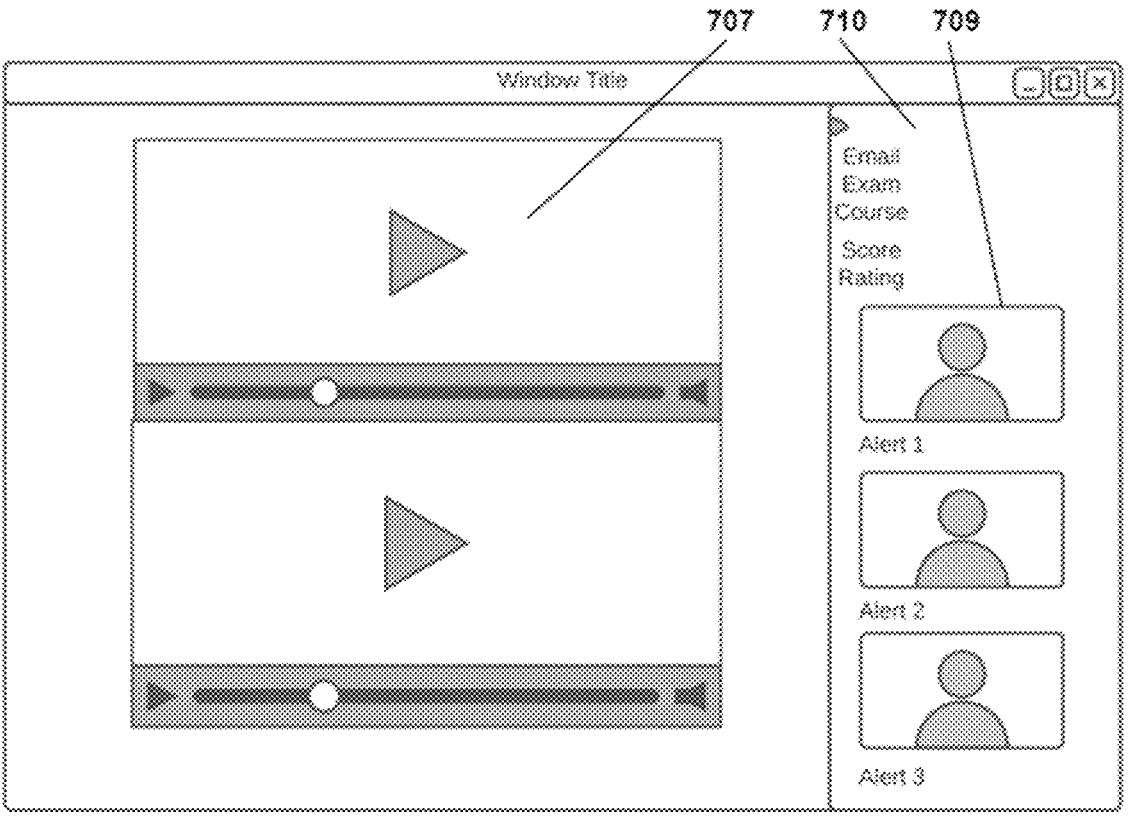
FIG. 7C shows an example of calling a new window in the administrator interface.

In the embodiment shown in FIG. 7C, the administrator GUI displayed on the viewing device allows an active tooltip 706 to be expanded in a new window when the active tooltip 706 is clicked. The new window is a page that displays a video stream 707 from the user's device and a feed 710 that reflects behavioral events and violations 709 recorded for that user.

The invention claimed is:

1. A data processing and communication system for administration of remote user activities interacting with critical data, the system comprising:
    a. monitoring code, installed on a user computer and configured to capture video data from a camera connected to the user computer in response to an access request to the critical data, audio data from a microphone connected to the user computer and desktop activity events on the user computer;
    b. administration code, installed on an administration server and configured to set up rules of user interactions with critical data on the user computer and provide users with access to the critical data on the user computer;

c. control code, installed on the administration server and configured to analyze user activity based on captured data and ranking user activity sessions by detected violations in accordance with rules of user interactions with the critical data on the user computer, wherein the rules of user interaction include violation weights determined for each type of violation, the control code comprising:

i. face recognition code configured to identify a user and to detect violations in user activity based on the captured video data, including authenticating the user based on a user photo image, wherein the user photo image is compared to a face recognized from the captured video;

ii. authorization code configured to authorize access to the critical data on the user computer if the authentication is successful;

iii. voice control code configured to detect violations in user activity based on the captured audio data; and iv. desktop control code configured to detect violations in user activity based on the captured desktop activity events, wherein the captured desktop activity events are events on the user computer and include at least one of connecting hardware, running software, switching between active windows of running applications, copying data, screenshot, capturing graphics card image, transferring data over the network, connecting an additional screen, opening a remote desktop session, or changing operating system configurations; and v. hardware-in-the-frame control code configured to detect violations of prohibited hardware device usage based on the captured video data; and d. display control code, installed on the administration server and configured to generate one or more hints in the form of web-application objects and to prioritize a view of the hints in accordance with user activity session ranks, including according to the type of violation in the user activity session, wherein the video data from the camera, the audio data from the microphone and the desktop activity events are captured in a synchronized manner, wherein each violation detected based on the video data, the audio data, or the desktop activity events is complemented with video, audio, and desktop activity events captured throughout a time period of the detected violation based on the synchronized manner.

2. The system of claim 1, wherein critical data includes at least one of confidential data, critical infrastructure services data, personal data, or examination tests.

3. The system of claim 1, wherein each violation detected based on the video data, the audio data or the desktop activity events and the complemented video, audio, and desktop activity events are stored in an associated manner.

4. The system of claim 3, wherein the video data from the camera, the audio data from the microphone and the desktop activity events are captured and stored from the start of a critical data access request.

5. The system of claim 1, wherein violation weight depends on a time period of violation.

6. The system of claim 1, wherein the violation in user activity based on the captured video data includes at least one of the appearance or change of emotion on a face, a change in a number of faces in a frame, a change in a direction of gaze, passage of biometric identification, immobility of object in the captured video data, wearing a mask, wearing sunglasses, wearing a hat, or applied makeup.

7. The system of claim 1, wherein the violation of prohibited hardware device usage includes at least an appearance of photo-video equipment in the frame, an appearance of a telephone in the frame, or an appearance of a digital storage medium in the frame.

8. The system of claim 1, wherein the violation in user activity based on the captured audio data includes at least one of dictation of data content, extraneous voice, extraneous noise, or user voice modification.

9. The system of claim 1, wherein web-application objects representing the hint includes at least one of pop-up window, link, webpage, html file, archive file, text file, xml file, database record, web-page frame or container, data block, script with executable instructions, programming code, audio record, video record, graphical image, or diagram.

10. The system of claim 1, wherein the voice control code is further configured to identify the user.

11. A method for administration of remote user activities interacting with critical data on the user computer, the method comprising:

a. capturing video data from a camera connected to a user computer, audio data from a microphone connected to the user computer and desktop activity events on the user computer in response to an access request to the critical data using monitoring code installed on the user computer, wherein the desktop activity events are events on the user computer and include at least one of connecting hardware, running software, switching between active windows of running applications, copying data, screenshot, capturing a graphics card image, transferring data over a network, connecting an additional screen, opening a remote desktop session, or changing operating system configurations;

b. authenticating the user based on a user photo image and a user voice sample at administration code, wherein the user photo image is compared to a face recognized from the captured video data and the user voice sample is compared to a voice recognized from the captured audio data;

c. authorizing access to the critical data on the user computer if the authentication is successful;

d. detecting violations of user activities in accordance with rules of user interactions with the critical data pre-configured at an administration server, wherein the rules of user interaction include violation weights determined for each type of violation, further comprising:

i. detecting violations in user activity based on the captured video data with face recognition code;

ii. detecting violations in user activity based on the captured audio data with voice control code; and iii. detecting violations in user activity based on the captured desktop activity events with desktop control code; and iv. detecting violations of prohibited hardware device usage based on the captured video data with hardware-in-the-frame control code; and e. ranking user activity sessions by detected violations in accordance with the rules of user interactions with the critical data;

f. generating hints in response to detected violation in the form of web-application objects; and g. displaying hints in prioritized manner, wherein a view of the hint is prioritized in accordance with user activity session ranks, including according to the type of violation in the user activity session, wherein the video data from the camera, the audio data from the microphone and the desktop activity events are captured in a synchronized manner, wherein each violation detected based on the video data, the audio data, or the desktop activity events is complemented with video, audio, and desktop activity events captured throughout a time period of the detected violation based on the synchronized manner.

12. The method of claim 11, wherein the critical data includes at least one of confidential data, critical infrastructure services data, personal data, or examination tests.

13. The method of claim 11, wherein each violation detected based on the video data, the audio data or the desktop activity events and the complemented video, audio, and desktop activity events captured throughout a time period of the detected violation are stored in an associated manner.

14. The method of claim 13, wherein the video data from the camera, the audio data from the microphone, and the data from desktop activity events are captured and stored from the start of a critical data access request.

15. The method of claim 11, wherein the violation weight depends on a time period of violation.

16. The method of claim 11, wherein the violation in user activity based on captured video data includes at least one of the appearance or change of emotion on a face, a change in the number of faces in the frame, a change in the direction of gaze, the passage of biometric identification, immobility of an object in the captured video data, wearing a mask, wearing sunglasses, wearing hats, or applied makeup.

17. The method of claim 11, wherein the violation of prohibited hardware device usage includes at least an appearance of photo-video equipment in the frame, an appearance of a telephone in the frame, or an appearance of a digital storage medium in the frame.

18. The method of claim 11, wherein the violation in user activity based on the captured audio data includes at least one of dictation of data content, extraneous voice, extraneous noise, or user voice modification.

19. The system of claim 1, wherein the display control code is further configured to:

compare a current violation counter value for the user with at least one preset threshold value and rank values of violation counters corresponding to a plurality of users, and display, in priority order, a predetermined number of hints about the behavior of the plurality of users who correspond to highest rank values of violation counters.

20. The method of claim 11, further comprising:

comparing a current violation counter value for the user with at least one preset threshold value and rank values of violation counters corresponding to a plurality of users, and wherein displaying hints in prioritized manner further comprises displaying, in priority order, a predetermined number of hints about the behavior of the plurality of users who correspond to highest rank values of violation counters.

* * * * *